March 5, 1963  B. T. QUIGLEY  3,079,813

PLANETARY GEARING

Filed Oct. 24, 1960

INVENTOR.
Bernard Thomas Quigley

United States Patent Office 3,079,813
Patented Mar. 5, 1963

3,079,813
PLANETARY GEARING
Bernard Thomas Quigley, 1878 Parker Blvd., Tonawanda, N.Y.
Filed Oct. 24, 1960, Ser. No. 64,461
1 Claim. (Cl. 74—687)

The invention relates to a controllable gearing assembly of the planetary type for transmitting and modifying motion from a driving shaft to a driven shaft in variable ratios primarily intended for use in, but not limited to, an automotive transmission of the automatic type. The instant structure may be controlled as described in my concurrent application Serial No. 671,217, now Patent No. 2,973,669, or other convenient means.

In general, the invention employs the operative characteristics of constantly interconnected planetary gear sets, which may be operatively combined with a suitable control mechanism whereby vehicle speeds ranging from low through intermediate and high may be effected in variable and continuous progression, corresponsive to the variable torque and load to which the driving and driven shafts are subjected.

Figure 1:
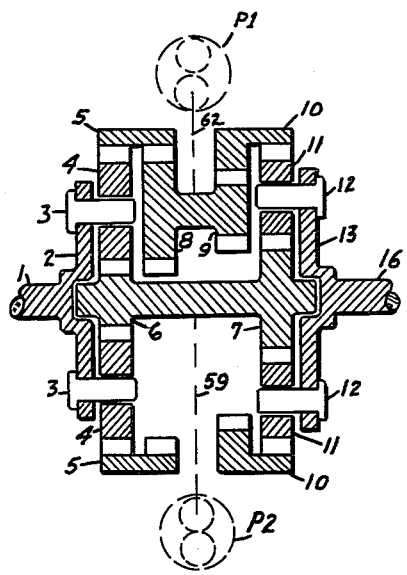

FIGURE 1 is a sectional view of a planetary gearing assembly embodying two planetary gear sets uniquely interconnected and structurally adaptable for use with a suitable control mechanism to form a unitary automatic transmission.

Figure 2:
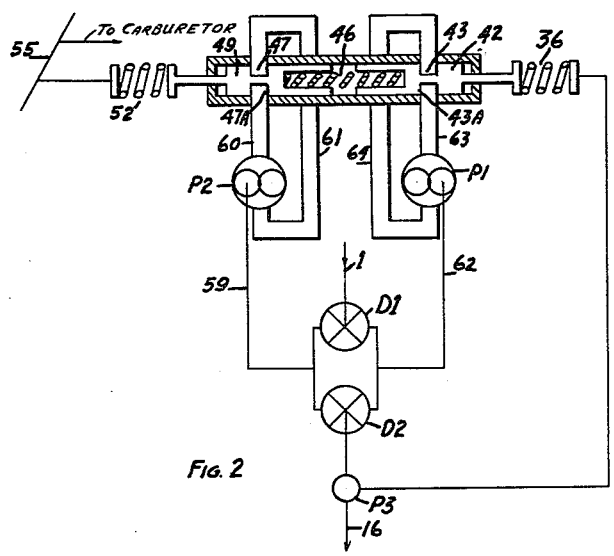

FIGURE 2 illustrates the structure specified in my aforementioned concurrent application showing, schematically, the interconnected driving and driven differential gear sets, identified therein by D1 and D2 respectively, which may be replaced by the instant interconnected driving and driven planetary gear sets, as may be desirable in structural arrangements other than as described in the aforesaid concurrent application.

FIGURE 1 illustrates a driving shaft 1 arranged to constantly connect a suitable power source to a driving planet carrier 2 of a driving planetary gear set, said planetary gear set to include driving planet gears 4 rotatably mounted on respective studs 3 carried on driving planet carrier 2, said driving planet gears 4 conventionally meshed with driving compound annulus gear 5 and driving sun gear 6 of compound sun gear set 6–7, in addition, compound annulus gear 5 is constantly meshed with gear 8 of compound gear set 8–9 and gear 9 is constantly meshed with driven compound annulus gear 10 so that said driving and driven compound annulus gears are constantly interconnected in a suitable gear ratio, shown herein as reduction ratio, the compound driving and driven sun gear set 6–7 is arranged to effect suitable gear ratio between driving planet gears 4 and driven planet gears 11, shown herein as increase ratio, driven planet gears 11 being conventionally meshed with sun gear 7 of compound sun gear set 6–7 and driven compound annulus gear 10, said driven planet gears 11 being rotatably mounted on respective studs 12 carried on driven planet carrier 13 of a driven planetary gear set, said driven planet carrier 13 being constantly connected to driven shaft 16. Said compound gear set 8–9 arranged to be rotatably controllable by means of a suitable control mechanism through coupling 62, and said compound sun gear set 6–7 arranged to be rotatably controllable by means of the aforesaid control mechanism through coupling 59, the aforesaid control mechanism to be as specified and claimed in my aforesaid concurrent application, or may be of other convenient form.

The instant device is controllable by the aforementioned control mechanism wherein one impeller of fluid pump P1 is coupled 62 with compound gear set 8–9 so that pump P1 is in operation when compound gear set 8–9 is rotating. The fluid output of pump P1 may be directed in either direction through conduit 63, valve aperture 43A, recessed chamber 43 of multi-position control valve 42 and conduit 64. Said valve 42, when operably actuated, will controllably vary aperture 43A and regulate the fluid output of pump P1, thereby effecting variable fluid resistance factors to react against the impellers of said fluid pump P1 and modify the rotative characteristics of compound gear set 8–9 through coupling 62. Similarly, one impeller of fluid pump P2 is coupled 59 with compound sun gear set 6–7 so that pump P2 is in operation when compound sun gear set 6–7 is rotated. The fluid output of pump P2 may be directed in either direction through conduit 60, valve aperture 47A, recessed chamber 47 of multi-position valve 49 and conduit 61. Said valve 49, when operably actuated, will controllably vary aperture 47A and regulate the fluid output of pump P2, thereby effecting variable fluid resistance factors to react against the impellers of said fluid pump P2 and modify the rotative characteristics of compound sun gear set 6–7 through coupling 59. Said valves 42 and 49 may be maintained in operative relationship with associated accelerator and speed responsive mechanisms by suitable springs 36, 46, 52 and actuated in operable combination as described in my aforesaid concurrent application.

The operative characteristics of my improvement in planetary gearing, when employed with the aforementioned control mechanism will be as follows: In neutral, with the vehicle stationary and engine running at idling speed, control valve apertures 43A and 47A are maintained in open position thereby allowing the impellers of pumps P1 and P2 to rotate freely. Vehicle inertia will arrest rotation of driven shaft 16 and driven planet carrier 13, so that engine idling torque will cause rotation of driving planet carrier 2, driving planet gears 4 on their respective studs, compound annulus gear 5, compound gear set 8–9, compound annulus gear 10, driven planet gears 11 on their respective studs, and compound sun gear set 6–7; with compound sun gear set 6–7 rotating in a direction opposite to that of compound annulus gear 5 and compound annulus gear 10. To effect vehicular motion, movement of the accelerator to increase engine speed simultaneously closes aperture 47A to block fluid flow through pump P2 and its associated fluid circuit, with aperture 43A maintained in open position to allow unrestricted operation of pump P1. With aperture 47A closed, fluid resistance will arrest rotation of the impellers of pump P2, coupling 59, compound gear set 8–9, driving compound annulus gear 5 and driven compound annulus gear 10, so that the power flow will rotate driving planet carrier 2 causing driving planet gears 4 to roll around stationary driving compound annulus gear 5 and rotate on their respective studs, thereby imparting torque to compound sun gears 6–7 causing driven planet gears 11 to roll around stationary driven compound annulus gear 10 imparting torque to driven planet carrier 13 and driven shaft 16 thereby overcoming vehicle inertia and effecting vehicular motion; the mechanism operating in low speed range. As vehicle speed increases, during normal operating conditions, the controlling action of the speed responsive device P3 is such as to progressively vary apertures 43A and 47A simultaneously and corresponsively vary the fluid resistance against the impellers of pumps P1 and P2, the arrangement being such as to increase fluid resistance against the impellers of pump P1 and simultaneously decrease fluid resistance against the impellers of pump P2. The resultant fluid resistance factors will cause rotational variations of the impellers of pumps P1 and P2 which, in turn, effect rotational variations of compound gear set 8–9 and compound sun gear set 6–7 through couplings 62 and 59 respectively in a manner which progressively decreases the angular velocity of compound gear set 8-9, driving compound annulus gear 5 and driven compound annulus gear 10; while progressively increasing the angular velocity of compound sun gear set 6-7. The power flow will be modified in accordance with the controlling action of the speed responsive device P3 in conjunction with appropriate ratio compound gear set 8-9 and compound sun gear set 6-7, and combined, by the operative characteristics of planetary gearing, to rotate driven planet carrier 13 and driven shaft 16 in a manner capable of effecting vehicle speeds ranging from low through intermediate and high in variable and continuous progression, corresponsive to the variable torque and load to which the driving and driven shafts are subjected.

The power source may be coupled to elements of the driving planetary gear set other than the driving planet carrier; respective elements of the driving and driven planetary gear sets other than those shown and described herein may be interconnected; and the driven shaft may be coupled to elements of the driven planetary gear set other than the driven planet carrier, as may be desirable in certain alternate constructions to effect the same function in a manner essentially equivalent to the instant device.

It is to be understood that the invention is not limited in application to the arrangement of parts and details of construction as illustrated in the appended drawing.

Further, the terminology, nomenclature and phraseology employed herein is for the purpose of description and not limitation.

I claim as new and desire to secure by Letters Patent:

In a controllable planetary gearing assembly, a driving planetary gear set; a driving shaft arranged to drivingly connect a power source to said driving planetary gear set; a driven planetary gear set; a driven shaft constantly coupled to said driven planetary gear set; each planetary gear set to include an annulus gear, suitable planet gears and a sun gear in conventional arrangement; means drivingly connecting the two said annulus gears, said means precluding the rotation of one of said annulus gears in a direction opposite to the other of said annulus gears; said driving and driven sun gears to be drivingly connected; control means being drivingly connected to the means drivingly connecting the two annulus gears and to the means connecting the two sun gears.

References Cited in the file of this patent

UNITED STATES PATENTS

| | | |
|---|---|---|
| 2,091,356 | Fawcett | Aug. 31, 1937 |
| 2,484,921 | Wolff | Oct. 18, 1949 |
| 2,924,123 | Giles | Feb. 9, 1960 |
| 2,948,164 | Neal | Aug. 9, 1960 |
| 2,973,669 | Quigley | Mar. 7, 1961 |